United States Patent
Lu et al.

(10) Patent No.: US 10,326,250 B2
(45) Date of Patent: Jun. 18, 2019

(54) METHOD FOR EXPANDING TUNING RANGE OF ALL-SOLID-STATE CONTINUOUS-WAVE SINGLE FREQUENCY LASER

(71) Applicant: Shanxi University, Taiyuan (CN)

(72) Inventors: Huadong Lu, Taiyuan (CN); Pixian Jin, Taiyuan (CN); Jing Su, Taiyuan (CN); Kunchi Peng, Taiyuan (CN)

(73) Assignee: Shanxi University, Taiyuan (CN)

( * ) Notice: Subject to any disclaimer, the term of this patent is extended or adjusted under 35 U.S.C. 154(b) by 0 days.

(21) Appl. No.: 16/015,868

(22) Filed: Jun. 22, 2018

(65) Prior Publication Data
US 2019/0089119 A1 Mar. 21, 2019

(30) Foreign Application Priority Data
Sep. 21, 2017 (CN) .......................... 2017 1 0861314

(51) Int. Cl.
*H01S 3/105* (2006.01)
*H01S 3/109* (2006.01)
(Continued)

(52) U.S. Cl.
CPC .............. *H01S 3/105* (2013.01); *H01S 3/083* (2013.01); *H01S 3/107* (2013.01); *H01S 3/1095* (2013.01); *H01S 3/1611* (2013.01); *H01S 3/1625* (2013.01); *H01S 3/1636* (2013.01); *H01S 3/1638* (2013.01); *H01S 3/1643* (2013.01); *H01S 3/1673* (2013.01)

(58) Field of Classification Search
CPC .......... H01S 3/105; H01S 3/083; H01S 3/107; H01S 3/1095; H01S 3/1611; H01S 3/1643; H01S 3/1636; H01S 3/1638; H01S 3/1673; H01S 3/1625
See application file for complete search history.

(56) References Cited

U.S. PATENT DOCUMENTS

2003/0007522 A1* 1/2003 Li ........................... H01S 5/141
372/20
2004/0151226 A1* 8/2004 Wittmann ............... H01S 5/028
372/49.01
(Continued)

*Primary Examiner* — Xinning(Tom) Niu
(74) *Attorney, Agent, or Firm* — Wood Herron & Evans LLP

(57) ABSTRACT

A method for expanding a tuning range of an all-solid-state continuous-wave single-frequency laser is provided. The method includes inserting a nonlinear frequency-doubling crystal into a laser resonant cavity, and converting a part of intra-cavity fundamental-frequency light to frequency-doubled light by the nonlinear frequency-doubling crystal, outputting the generated frequency-doubled light and the fundamental-frequency light together from the laser resonant cavity, and separating the two via a spectroscope. The method also includes splitting a part of the fundamental-frequency light reflected by the spectroscope through an optical beam-splitter, and outputting the remaining part of the fundamental-frequency light as a main laser. A cavity length of the laser resonant cavity is changed by adjusting a voltage loaded on a piezoelectric ceramic of the all-solid-state continuous-wave single-frequency laser, thereby achieving continuous frequency-tuning of the all-solid-state continuous-wave single-frequency laser.

8 Claims, 2 Drawing Sheets

(51) Int. Cl.
*H01S 3/107* (2006.01)
*H01S 3/083* (2006.01)
*H01S 3/16* (2006.01)

(56) References Cited

U.S. PATENT DOCUMENTS

2010/0027571 A1* 2/2010 Murdoch ................ H01S 3/083
372/22
2010/0054284 A1* 3/2010 Dekker ................ H01S 3/1086
372/3

* cited by examiner

METHOD FOR EXPANDING TUNING RANGE OF ALL-SOLID-STATE CONTINUOUS-WAVE SINGLE FREQUENCY LASER

CROSS-REFERENCE TO RELATED APPLICATION

This application claims priority to Chinese application number 201710861314.4, filed Sep. 21, 2017. The above-mentioned patent application is incorporated herein by reference in its entirety.

TECHNICAL FIELD

The present invention pertains to the technical field of a tunable laser, and, in particular, relates to a method for expanding a tuning range of an all-solid-state continuous-wave single-frequency laser.

BACKGROUND

An all-solid-state continuous-wave single-frequency laser is widely used in scientific research fields such as quantum optics, quantum information, cold atomic physics, and optical frequency standards because of its advantages of low intensity noise, high beam quality, high output power, high stability, and the like. In experimental applications such as cold atomic physics and optical frequency standards, to accurately match the output frequency of the laser with the atomic transition absorption line, a laser is required to have a certain capability of continuous frequency-tuning while having a relatively wide tuning range. To achieve output frequency tuning of the laser, one of the most common methods is to insert an etalon into a resonant cavity of a laser.

The frequency-tuning of an all-solid-state single-frequency laser can be achieved by adjusting the effective optical path of an etalon, for example, adjusting the incident angle of an etalon, adjusting the temperature of an etalon, or adjusting the refractive index of an electro-optic etalon using the electro-optic effect of an electro-optic crystal. After the etalon transmission peak is locked together with the oscillating mode of the laser resonant cavity in real time, continuous frequency-tuning of the all-solid-state single-frequency laser can be achieved by scanning the cavity length of the laser resonant cavity. However, an all-solid-state single-frequency tunable laser obtained by this method has a tuning range limited to a free spectral region of the adopted etalon. To obtain a wider tuning range, such as covering an overall gain line width of a laser gain medium, it is required to use a thinner etalon, usually of a few hundred micrometers, and meanwhile in order to ensure the mode selection capability of the etalon, it is required that the etalon is coated with a film having a certain reflectivity, or a combination of two etalons with different thicknesses is adopted, which on one hand increases the difficulty in designing and processing the etalon, and on the other hand increases the difficulty in designing the all-solid-state continuous-wave single-frequency laser.

Accordingly, it would be desirable to improve upon the conventional methods used for expanding a tuning range of an all-solid-state continuous-wave single-frequency laser.

SUMMARY

An objective of the present invention is to overcome the limitations of the prior designs and provide a method that is easy and convenient to operate and can effectively expand a continuous frequency-tuning range of an all-solid-state continuous-wave single-frequency laser.

To this end, a method is provided in one embodiment for expanding a tuning range of an all-solid-state continuous-wave single-frequency laser, including the steps of: (1) inserting a nonlinear frequency-doubling crystal into a laser resonant cavity of the all-solid-state continuous-wave single-frequency laser such that the nonlinear frequency-doubling crystal is located at the waist spot of the laser resonant cavity; (2) after the all-solid-state continuous-wave single-frequency laser works normally, converting a part of intra-cavity fundamental-frequency light to frequency-doubled light by the nonlinear frequency-doubling crystal, outputting the generated frequency-doubled light and the fundamental-frequency light together from the laser resonant cavity, and separating the two via a spectroscope, wherein the reflected light of the spectroscope is fundamental-frequency light, and the transmission light of the spectroscope is frequency-doubled light; (3) splitting a part of the fundamental-frequency light reflected by the spectroscope through an optical beam-splitter of the all-solid-state continuous-wave single-frequency laser into a photodetector of the all-solid-state continuous-wave single-frequency laser, outputting the remaining part of the fundamental-frequency light as a main laser, converting an incident light signal into an electrical signal by the photodetector and inputting the electrical signal into an input terminal of a servo controller of the all-solid-state continuous-wave single-frequency laser, generating a control signal by the servo controller and inputting the control signal into a signal input terminal of a galvanometer motor bonded with an etalon of the all-solid-state continuous-wave single-frequency laser to control the galvanometer motor to rotate, such that the etalon is rotated under the drive of the galvanometer motor, thereby changing an incident angle of the etalon, and locking a transmission peak of the etalon to the oscillating mode of the laser resonant cavity in real time; and (4) changing a cavity length of the laser resonant cavity by adjusting a voltage loaded on a piezoelectric ceramic of the all-solid-state continuous-wave single-frequency laser, so as to achieve continuous frequency-tuning of the all-solid-state continuous-wave single-frequency laser. The achievable maximum tuning range $\Delta v$ is expressed as:

$$\Delta v = v_{FSR} + \frac{\left(\frac{\Delta v_H}{2}\right)^2}{v_{FSR}} \times \frac{\eta}{\eta + L}$$

wherein, $V_{FSR}$ is a free spectral region of the etalon, $\Delta_{vH}$ is a gain line width of a laser gain medium of the all-solid-state continuous-wave single-frequency laser, $\eta$ is a frequency-doubling conversion efficiency of the nonlinear frequency doubling crystal, and L is the linear loss of the laser resonant cavity.

In one aspect, the material of the nonlinear frequency-doubling crystal of the present invention is a lithium triborate crystal, a bismuth borate crystal, a barium metaborate crystal, a periodically polarized potassium titanyl phosphate crystal, or a periodically polarized lithium tantalate crystal.

In another aspect, the laser resonant cavity described by the present invention is a unidirectional operating ring resonant cavity.

In a further aspect, the pumping manner of a pumping source in the all-solid-state continuous-wave single-frequency laser of the present invention is end pumping or side pumping.

In some embodiments, the material of the etalon of the present invention is fused silica or electro-optic crystal, and the etalon is bonded on a rotating shaft of the galvanometer motor of the all-solid-state continuous-wave single-frequency laser.

In further embodiments, the laser gain medium of the present invention is a gain crystal of Nd:YVO$_4$, Nd:YAG, Nd:YAP, and Ti:sapphire.

In one aspect, the pumping manner of the pumping source described by the present invention is single-end pumping or double-end pumping.

In another aspect, the electro-optic crystal described by the present invention is a lithium niobate crystal or a lithium tantalate crystal.

The principle of the method for expanding a tuning range of an all-solid-state continuous-wave single-frequency laser in accordance with embodiments of the present invention is for a fundamental-frequency-light laser, a laser mode corresponding to the etalon transmission peak and being adjacent to the center frequency of the laser gain medium starts to oscillate through the mode selection effect of the etalon. By adjusting an incident angle of the etalon, the frequency corresponding to the etalon transmission peak will change accordingly, and thus the output frequency of the laser will also change accordingly, thereby achieving frequency-tuning of the laser, but its tuning range is limited to one free spectral region of the etalon. When there is no nonlinear frequency-doubling crystal inserted in the laser resonant cavity, and the etalon transmission peak is locked together with the oscillating mode of the laser resonant cavity in real time, by scanning the cavity length of the laser resonant cavity continuous frequency-tuning of the laser can be achieved, and its tuning range is also limited to one free spectral region of the etalon. However, when a nonlinear frequency-doubling crystal is inserted into the laser resonant cavity, a certain nonlinear loss is introduced to the intracavity fundamental-frequency light. When the etalon transmission peak is locked with the oscillating mode in the laser resonant cavity in real time, and the cavity length of the laser resonant cavity is scanned such that when the etalon operates at or beyond its tuning edge (i.e., two adjacent transmission peaks of the etalon are symmetrically distributed on two sides of a central wavelength of the laser gain medium) and continues to move in a short-wave (or long-wave) direction, there is no mode-hopping phenomenon since the nonlinear loss experienced by the main oscillating mode is half that of a non-oscillating mode and the difference between the nonlinear losses experienced by the main oscillating mode and the non-oscillating mode is equal to the frequency-doubling conversion efficiency of the nonlinear frequency doubling crystal, the non-oscillating mode is automatically suppressed, and thus the output frequency of the all-solid-state single-frequency laser can continue to be continuously tuned without mode hopping until the difference between the gains of the laser gain media at the frequencies corresponding to the two adjacent transmission peaks of the etalon is equal to the frequency-doubling conversion efficiency of the nonlinear frequency doubling crystal. Therefore, by combining the intra-cavity locked etalon with the intra-cavity nonlinear loss, the tuning range of the laser can exceed one free spectral region of the etalon, and its tuning range $\Delta v$ is expressed as:

$$\Delta v = v_{FSR} + \frac{\left(\frac{\Delta v_H}{2}\right)^2}{v_{FSR}} \times \frac{\eta}{\eta + L}$$

wherein, $V_{FSR}$ is a free spectral region of the etalon, $\Delta v_H$ is a gain line width of a laser gain medium, $\eta$ is a frequency-doubling conversion efficiency of the nonlinear frequency doubling crystal, and L is the linear loss of the laser resonant cavity.

Compared with the prior art, the method described herein achieves several advantages and beneficial effects. These include the continuous frequency-tuning range of the all-solid-state continuous-wave single-frequency laser can be effectively expanded by using the method provided by the present invention, which breaks through the limitation of one free spectral region of the etalon. Moreover, according to the formula above, by reasonably designing the all-solid-state continuous-wave single-frequency laser and selecting a suitable etalon and a suitable nonlinear loss introduced by the nonlinear frequency doubling crystal, an all-solid-state continuous-wave single-frequency tunable laser with a tuning range covering the gain line width of the laser gain medium can be easily obtained. The present invention can be easily implemented in an existing intracavity frequency-doubled all-solid-state continuous-wave single-frequency laser. Furthermore, the present invention is applicable for expanding a tuning range of an all-solid-state continuous-wave single-frequency laser with any cavity structure.

In view of the above, the present invention can effectively expand the continuous frequency-tuning range of the all-solid-state continuous-wave single-frequency laser, has a simple design and is convenient to operate.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawing. The accompanying drawing, which is incorporated in and constitute a part of this specification, illustrates one or more embodiments of the invention and, together with the general description given above and the detailed description given below, explains the one or more embodiments of the invention.

DETAILED DESCRIPTION

Embodiments of the invention are illustrated below with reference to the accompanying drawings. The preferred embodiments described here are used only to describe and explain the present disclosure, but not to limit the present disclosure.

Embodiment 1

Figure 1:
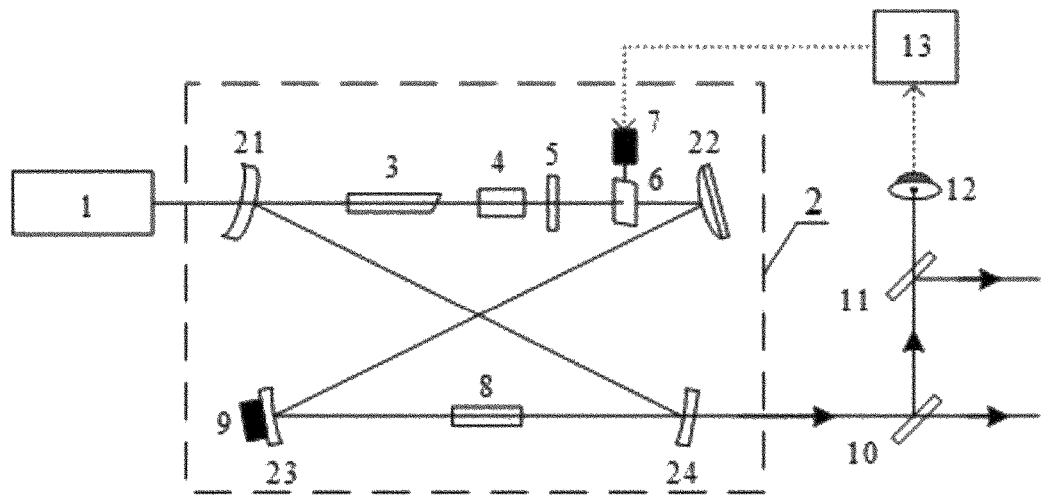
FIG. 1 is a schematic structural diagram of a laser-diode end-pumped all-solid-state continuous-wave single-frequency tunable laser having an "8"-shaped four-mirror ring resonant cavity according to one embodiment of the present invention.

FIG. 1 shows the device structure of a laser-diode end-pumped all-solid-state continuous-wave single-frequency tunable laser having an "8"-shaped four-mirror ring resonant cavity, including a pump source 1, a ring resonant cavity 2 consisting of cavity mirrors (21, 22, 23, 24), a laser gain medium 3, a magneto-optical medium 4 placed in a permanent magnet, a half-wave plate 5, an etalon 6, a galvanometer motor 7, a nonlinear frequency-doubling crystal 8, a piezoelectric ceramic 9, a beam splitter 10, an optical beam-splitter 11, a photodetector 12, and a servo controller 13. A pumping light emitted from the pump source 1 is focused on the center of the laser gain medium 3 via a coupling system. The laser resonant cavity has a structure of "8"-shaped four-mirror ring resonant cavity composed of an input coupling mirror 21, a first cavity mirror 22, a second cavity mirror 23, and an output coupling mirror 24. The input coupling mirror 21 is a concave-convex mirror coated with a film of antireflection for the pumping light and high reflection for the fundamental-frequency light, the first cavity mirror 22 and the second cavity mirror 23 are respectively a plano-convex mirror and a plano-concave cavity each coated with a film of high reflection for the fundamental-frequency light, and the output coupling mirror 24 is a plano-concave mirror coated with a film of high reflection for the fundamental-frequency light and a film of high transmission for the frequency-doubled light. The second cavity mirror 23 is mounted on the piezoelectric ceramic 9. The magneto-optical medium 4 is a TGG crystal, and an optical one-way device consisting of the TGG crystal 4 encapsulated by a permanent magnet and the half-wave plate 5 ensures the single-frequency operation of the laser. The etalon 6 is bonded on the rotating shaft of the galvanometer motor 7, and the nonlinear frequency-doubling crystal 8 is located at the beam waist of the fundamental mode between the second cavity mirror 23 and the output coupling mirror 24, placed in a red copper temperature-controlled furnace with the temperature being controlled by adopting a thermoelectric cooler.

After the all-solid-state continuous-wave single-frequency laser operates normally, the laser beam output from the laser resonant cavity is separated by the beam splitter 10, wherein the light reflected by the beam splitter 10 is fundamental-frequency light, and the light transmitted thereby is frequency-doubled light. A part of the fundamental-frequency light reflected by the beam splitter 10 is split by the optical beam-splitter 11 into the photodetector 12 and the remaining part of the fundamental-frequency light is output as the main laser. The photodetector 12 converts an incident light signal into an electric signal and the generated electric signal is input to a signal input terminal of the servo controller 13. The servo controller 13 generates a control signal and the generated control signal is input into a signal input end of the galvanometer motor 7 to control the galvanometer motor 7 to rotate, and then the etalon 6 is rotated under the drive of the rotation of the galvanometer motor 7 to change the incident angle of the etalon 6, thereby achieving feedback control of the incident angle of the etalon 6 and locking a transmission peak of the etalon 6 on the oscillating mode of the laser resonant cavity 2 in real time. By adjusting a voltage loaded on the piezoelectric ceramic 9 and changing the cavity length of the laser resonant cavity 2, continuous frequency-tuning of all-solid-state continuous-wave single-frequency laser is realized.

The material of the nonlinear frequency-doubling crystal 8 described by this embodiment is a lithium triborate crystal, a bismuth borate crystal, a barium metaborate crystal, a periodically polarized potassium titanyl phosphate crystal, or a periodically polarized lithium tantalate crystal.

The pumping manner of the pumping source 1 described by this embodiment is end pumping or side pumping, and is single-end pumping or double-end pumping. The material of the etalon 6 described in this embodiment is fused silica, lithium niobate crystal or lithium tantalate crystal.

The laser gain medium 3 described in this embodiment is a gain crystal of Nd:YVO$_4$, Nd:YAG, Nd:YAP or Ti:sapphire.

Embodiment 2

Figure 2:
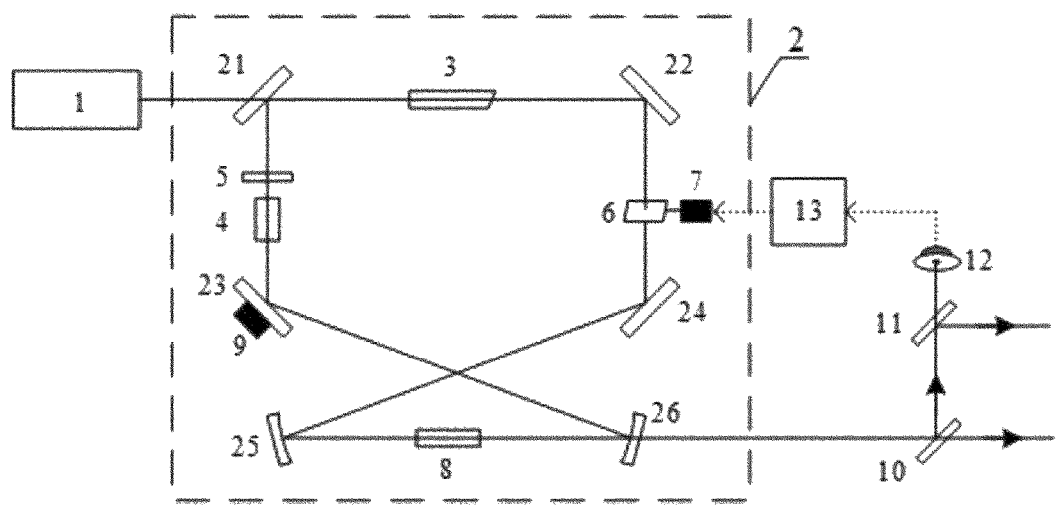
FIG. 2 is a schematic structural diagram of a laser-diode end-pumped all-solid-state continuous-wave single-frequency tunable laser having a six-mirror ring resonant cavity according to another embodiment of the present invention.

FIG. 2 shows the device structure of a laser-diode end-pumped all-solid-state continuous-wave single-frequency tunable laser having a six-mirror ring resonator cavity, including a pump source 1, a ring resonant cavity 2 consisting of cavity mirrors (21, 22, 23, 24, 25, 26), a laser gain medium 3, a magneto-optical medium 4 placed in a permanent magnet, a half-wave plate 5, an etalon 6, a galvanometer motor 7, a nonlinear frequency-doubling crystal 8, a piezoelectric ceramic 9, a beam splitter 10, an optical beam-splitter 11, a photodetector 12, and a servo controller 13. The laser resonant cavity has a structure of six-mirror ring resonant cavity composed of an input coupling mirror 21, a first cavity mirror 22, a second cavity mirror 23, a third cavity mirror 24, a fourth cavity mirror 25, and an output coupling mirror 26. The input coupling mirror 21 is a flat mirror coated with a film of antireflection for the pumping light and high reflection for the fundamental-frequency light, each of the first cavity mirror 22, the second cavity mirror 23, the third cavity mirror 24 is a flat mirror coated with a film of high reflection for the fundamental-frequency light, the fourth cavity mirror 25 is a plano-concave mirror coated with a film of high reflection for the fundamental-frequency light, and the output coupling mirror 26 is a plano-concave mirror coated with a film of high reflection for the fundamental-frequency light and a film of high transmission for the frequency-doubled light. The second cavity mirror 23 is mounted on the piezoelectric ceramic 9. In all other respects, the laser includes a similar arrangement as described above for FIG. 1 and Embodiment 1.

Figure 3:
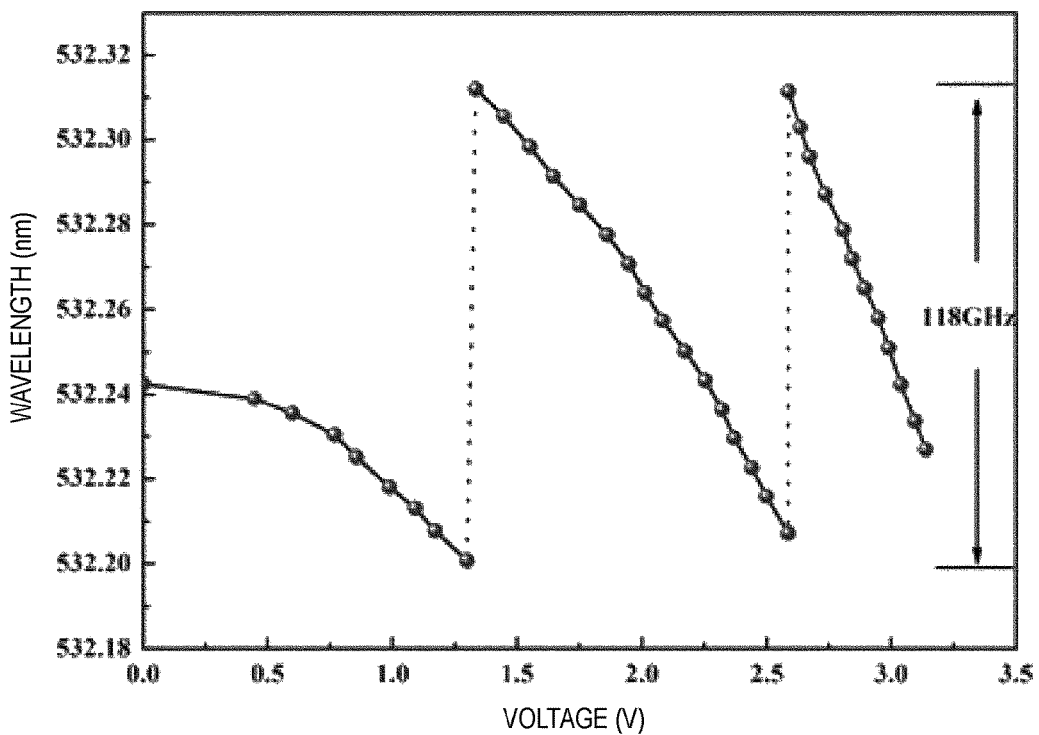
FIG. 3 is a graphical plot showing a tuning curve of an etalon of the all-solid-state continuous-wave single-frequency tunable laser of FIG. 1.

Taking the situation in which the Nd:YVO$_4$ crystal is used as the laser gain medium 3, the lithium triborate crystal is used as the nonlinear frequency-doubling crystal 8, and the etalon 6 is made of a 1-mm-thick lithium niobate crystal as an example, when the all-solid-state continuous-wave single-frequency laser operates normally, the linear loss of the laser resonant cavity 2 is L=5.8%. Where the pump power is 7.87 W and the power of the frequency-doubled light (532 nm) is 2.1 W, the frequency-doubling conversion efficiency of the nonlinear frequency-doubling crystal 8 is η=1.87%. When the etalon 6 is not locked, by adjusting the incident angle of the etalon 6 through adjustment of the voltage loaded on the galvanometer motor 7, the tuning curve of the etalon 6 is measured, as shown in FIG. 3. It can be seen from the figure that the free spectral region of the etalon 6 is $V_{FSR}$=59 GHz@1064 nm (118 GHz@532 nm). The gain line width of the Nd:YVO$_4$ crystal is 255 GHz@1064 nm. Based on the known parameter values and the formula provided in the summary section above, the calculated continuous tuning range of the output frequency of the all-solid-state continuous-wave single-frequency laser can reach 126.18 GHz@1064 nm (252.36 GHz@532 nm).

Figure 4:
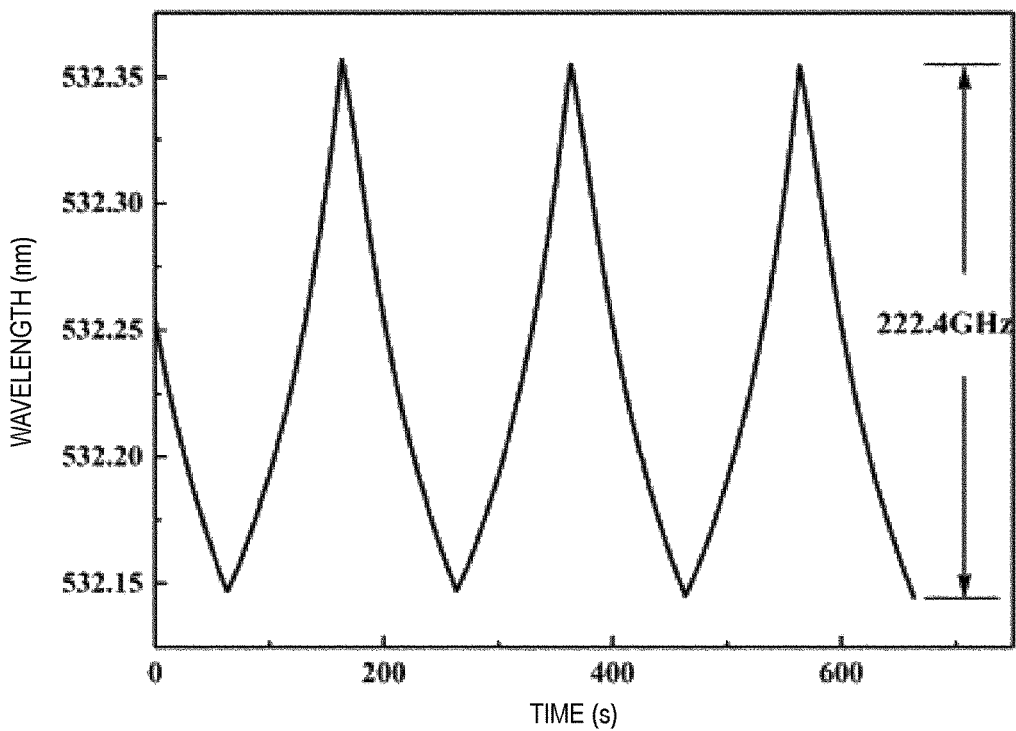
FIG. 4 is a graphical plot showing a continuous frequency-tuning curve of the all-solid-state continuous-wave single-frequency tunable laser of FIG. 1.

In the experiment, by adjusting the incident angle of the etalon 6 through adjustment of the voltage loaded on the galvanometer motor 7, when the output wavelength of the all-solid-state continuous-wave single-frequency laser is tuned to 532.2549 nm, the continuous tuning of the output wavelength (or frequency) of the all-solid-state continuous-wave single-frequency laser is realized by locking a transmission peak of the etalon 6 to the oscillating mode in the laser resonant cavity 2 in real time using the servo controller 13, and scanning the cavity length of the laser resonant cavity 2 through scanning of the voltage loaded on the piezoelectric ceramic 9. The resultant wavelength scan curve of the frequency-doubled light is shown in FIG. 4, and the output wavelength of the all-solid-state continuous-wave single-frequency laser can be continuously tuned from 532.1471 nm to 532.3570 nm, corresponding to a frequency range of 222.4 GHz. This range has a certain deviation from the theoretically calculated tuning range of 252.36 GHz, which may be caused by some deviation between the parameter values used in the theoretical calculation and the parameter values in the actual all-solid-state continuous-wave single-frequency laser. However, such a tuning range is already well beyond one free spectral range of the etalon 6 (118 GHz@532 nm). The above results show that the continuous tuning range of the all-solid-state continuous-wave single-frequency laser is effectively extended by combining the intra-cavity locked etalon with the intra-cavity nonlinear loss.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A method for expanding a tuning range of an all-solid-state continuous-wave single-frequency laser, comprising:
   (1) inserting a nonlinear frequency-doubling crystal into a laser resonant cavity of the all-solid-state continuous-wave single-frequency laser such that the nonlinear frequency-doubling crystal is located at a waist spot of the laser resonant cavity, wherein a pumping light emitted from a pump source is delivered into the laser resonant cavity so as to first be focused on a center of a laser gain medium via a coupling system, the laser resonant cavity has a structure of "8"-shaped four-mirror ring resonant cavity defined by an input coupling mirror, a first cavity mirror, a second cavity mirror, and an output coupling mirror, wherein the input coupling mirror is a concave-convex mirror coated with a film of antireflection for the pumping light and high reflection for a fundamental-frequency light, the first cavity mirror is a plano-convex mirror coated with a film of high reflection for the fundamental-frequency light, the second cavity mirror is a plano-concave cavity coated with a film of high reflection for the fundamental-frequency light, the output coupling mirror is a plano-concave mirror coated with a film of high reflection for the fundamental-frequency light and a film of high transmission for a frequency-doubled light, wherein the second cavity mirror is mounted on a piezoelectric ceramic, and the light passing through the laser gain medium then moves through an optical one-way device consisting of a magneto-optical medium encapsulated by a permanent magnet and a half-wave plate, which ensures a single-frequency operation of the laser, the light then flows from the optical one-way device to an etalon that is bonded on a rotating shaft of a galvanometer motor, and the light then reflects off the first and second cavity mirrors before arriving at the nonlinear frequency-doubling crystal located at the beam waist of a fundamental mode between the second cavity mirror and the output coupling mirror;
   (2) after the all-solid-state continuous-wave single-frequency laser operates, converting a part of intra-cavity fundamental-frequency light to frequency-doubled light by the nonlinear frequency-doubling crystal, outputting the frequency-doubled light and the fundamental frequency light together from the laser resonant cavity, and separating the generated frequency-doubled light and the fundamental frequency light via a beam splitter, wherein a reflected light of the beam splitter is fundamental-frequency light, and a transmission light of the beam splitter is frequency-doubled light;
   (3) splitting a part of the fundamental frequency light reflected by the beam splitter through an optical beam-splitter of the all-solid-state continuous-wave single-frequency laser into a photodetector of the all-solid-state continuous-wave single-frequency laser, outputting a remaining part of the fundamental frequency light as a main laser, converting an incident light signal into an electrical signal by the photodetector and inputting the electrical signal into an input terminal of a servo controller of the all-solid-state continuous-wave single-frequency laser, generating a control signal by the servo controller and inputting the control signal into a signal input terminal of the galvanometer motor bonded with the etalon of the all-solid-state continuous-wave single-frequency laser to control the galvanometer motor to rotate, such that the etalon is rotated under drive of the galvanometer motor, thereby changing an incident angle of the etalon, and locking a transmission peak of the etalon on an oscillating mode of the laser resonant cavity in real time; and
   (4) changing a cavity length of the laser resonant cavity by adjusting a voltage loaded on the piezoelectric ceramic of the all-solid-state continuous-wave single-frequency laser, so as to achieve continuous frequency-tuning of the all-solid-state continuous-wave single-frequency laser, wherein the achievable maximum tuning range $\Delta v$ is expressed as:

$$\Delta v = v_{FSR} + \frac{\left(\frac{\Delta v_H}{2}\right)^2}{v_{FSR}} \times \frac{\eta}{\eta + L}$$

wherein, $v_{FSR}$ is a free spectral region of the etalon, $\Delta v_H$ is a gain line width of a laser gain medium of the all-solid-state continuous-wave single-frequency laser, $\eta$ is a frequency-doubling conversion efficiency of the nonlinear frequency doubling crystal, and L is a linear loss of the laser resonant cavity.

2. The method of claim 1, wherein a material of the nonlinear frequency-doubling crystal is at least one of a lithium triborate crystal, a bismuth borate crystal, a barium metaborate crystal, a periodically polarized potassium titanyl phosphate crystal, and a periodically polarized lithium tantalate crystal.

3. The method of claim 1, wherein the laser resonant cavity is a unidirectional operating ring resonant cavity.

4. The method of claim 1, wherein a pumping manner of the pumping source of the all-solid-state continuous-wave single-frequency laser is end pumping or side pumping.

5. The method of claim 1, wherein a material of the etalon is fused silica or an electro-optic crystal, and the etalon is bonded on a rotating shaft of the galvanometer motor of the all-solid-state continuous-wave single-frequency laser.

6. The method of claim 5, wherein the electro-optic crystal is a lithium niobate crystal or a lithium tantalate crystal.

7. The method of claim 1, wherein the laser gain medium is a gain crystal of $Nd:YVO_4$, Nd:YAG, Nd:YAP or Ti:sapphire.

8. The method of claim 1, wherein a pumping manner of a pumping source of the all-solid-state continuous-wave single-frequency laser is single-end pumping or double-end pumping.

* * * * *